(12) United States Patent
Tiwari et al.

(10) Patent No.: US 12,223,315 B2
(45) Date of Patent: Feb. 11, 2025

(54) UTILIZING MULTIPLE ANALYSES TO MIGRATE AN APPLICATION TO A CLOUD COMPUTING ENVIRONMENT

(71) Applicant: Accenture Global Solutions Limited, Dublin (IE)

(72) Inventors: Sanjay Tiwari, Bengaluru (IN); Nishant Shyam Patriker, Pune (IN); Sanmati Jain, Ghaziabad (IN); Dan Malagari, Georgetown, TX (US); Trupti Meghshyam Shirodkar, New Panvel (IN); Mayur Kolhe, Bengaluru (IN); Amol Nandkishor Joshi, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 174 days.

(21) Appl. No.: 18/126,218

(22) Filed: Mar. 24, 2023

(65) Prior Publication Data

US 2024/0319992 A1 Sep. 26, 2024

(51) Int. Cl.
*G06F 8/72* (2018.01)
*G06F 8/73* (2018.01)
*G06F 8/76* (2018.01)

(52) U.S. Cl.
CPC ............... *G06F 8/72* (2013.01); *G06F 8/73* (2013.01); *G06F 8/76* (2013.01)

(58) Field of Classification Search
CPC .............. G06F 8/72; G06F 8/73; G06F 8/76
USPC ....................................................... 717/106
See application file for complete search history.

(56) References Cited

U.S. PATENT DOCUMENTS

| | | | | |
|---|---|---|---|---|
| 8,607,200 | B2 * | 12/2013 | Kunze | G06F 9/44536 |
| | | | | 717/124 |
| 8,856,725 | B1 * | 10/2014 | Anderson | G06F 8/75 |
| | | | | 717/103 |
| 8,881,139 | B1 * | 11/2014 | Acacio | G06F 8/76 |
| | | | | 717/177 |
| 9,588,820 | B2 * | 3/2017 | Ravi | G06F 9/5072 |
| 9,595,054 | B2 * | 3/2017 | Jain | G06F 9/5072 |
| 9,619,371 | B2 * | 4/2017 | Adderly | G06F 8/65 |

(Continued)

OTHER PUBLICATIONS

Justas Kazanavicius * et al. An Approach to Migrate a Monolith Database into Multi-Model Polyglot Persistence Based on Microservice Architecture: A Case Study for Mainframe Database. Appl. Sci. 2022, 12, 6189.*

*Primary Examiner* — Francisco J Aponte
(74) *Attorney, Agent, or Firm* — Polsinelli PC

(57) ABSTRACT

A device may receive source code and a database to be migrated to a cloud computing environment, and may perform a first stage analysis of the source code to generate a first report. The device may cause a second stage analysis of the source code to be performed based on the first report and to generate refactored and rewritten code, and may perform a third stage analysis of the database to generate a second report. The device may cause a fourth stage analysis of the database to be performed and to generate a refactored and rewritten database, and may perform the first stage analysis of the refactored and rewritten code and the third stage analysis of the refactored and rewritten database to generate a final report. The device may generate a migration strategy based on the final report and may perform actions based on the migration strategy.

20 Claims, 12 Drawing Sheets

(56) References Cited

U.S. PATENT DOCUMENTS

| | | | |
|---|---|---|---|
| 9,772,830 B2* | 9/2017 | Balasubramanian | G06F 8/60 |
| 10,489,151 B1* | 11/2019 | Katan | G06F 8/73 |
| 10,782,934 B1* | 9/2020 | Chawda | G06F 8/30 |
| 11,055,066 B2* | 7/2021 | Junior | G06F 9/5072 |
| 11,288,163 B1* | 3/2022 | Kowalewski | G06F 11/3428 |
| 11,809,841 B1* | 11/2023 | Zhang | G06F 8/33 |
| 11,836,485 B1* | 12/2023 | Cancilla | G06F 8/75 |
| 12,131,152 B2* | 10/2024 | Shivanna | G06F 8/77 |
| 2014/0012562 A1* | 1/2014 | Chang | G06F 11/3461 703/22 |
| 2014/0282439 A1* | 9/2014 | Kannan | G06F 8/76 717/140 |
| 2015/0032894 A1* | 1/2015 | Rosensweig | G06F 9/5088 709/226 |
| 2015/0341240 A1* | 11/2015 | Iyoob | G06Q 30/0631 709/201 |
| 2016/0094477 A1* | 3/2016 | Bai | H04L 47/786 709/226 |
| 2016/0112510 A1* | 4/2016 | Bai | G06F 9/45558 709/217 |
| 2017/0279692 A1* | 9/2017 | Llagostera | H04L 41/5051 |
| 2017/0373935 A1* | 12/2017 | Subramanian | G06F 11/3006 |
| 2018/0121320 A1* | 5/2018 | Dolby | G06F 11/3604 |
| 2018/0191599 A1* | 7/2018 | Balasubramanian | G06F 9/5072 |
| 2018/0253373 A1* | 9/2018 | Mathur | G06F 11/3404 |
| 2018/0285099 A1* | 10/2018 | Mandava | G06F 11/3668 |
| 2019/0102411 A1* | 4/2019 | Hung | G06N 5/025 |
| 2019/0213104 A1* | 7/2019 | Qadri | H04L 67/1097 |
| 2019/0377611 A1* | 12/2019 | Khan | G06Q 10/06315 |
| 2020/0125404 A1* | 4/2020 | Klein | G06F 9/5027 |
| 2020/0274900 A1* | 8/2020 | Vaishnavi | H04L 63/20 |
| 2020/0387356 A1* | 12/2020 | Davis | G06F 8/72 |
| 2021/0326121 A1* | 10/2021 | Ackroyd | G06F 8/33 |
| 2021/0349745 A1* | 11/2021 | Kelly | G06F 8/63 |
| 2021/0373860 A1* | 12/2021 | Khan | G06F 9/546 |
| 2022/0300357 A1* | 9/2022 | Pal | G06F 9/4856 |
| 2023/0188613 A1* | 6/2023 | Velammal | G06F 8/72 709/203 |
| 2023/0251856 A1* | 8/2023 | Ni | G06N 3/0464 717/120 |

\* cited by examiner

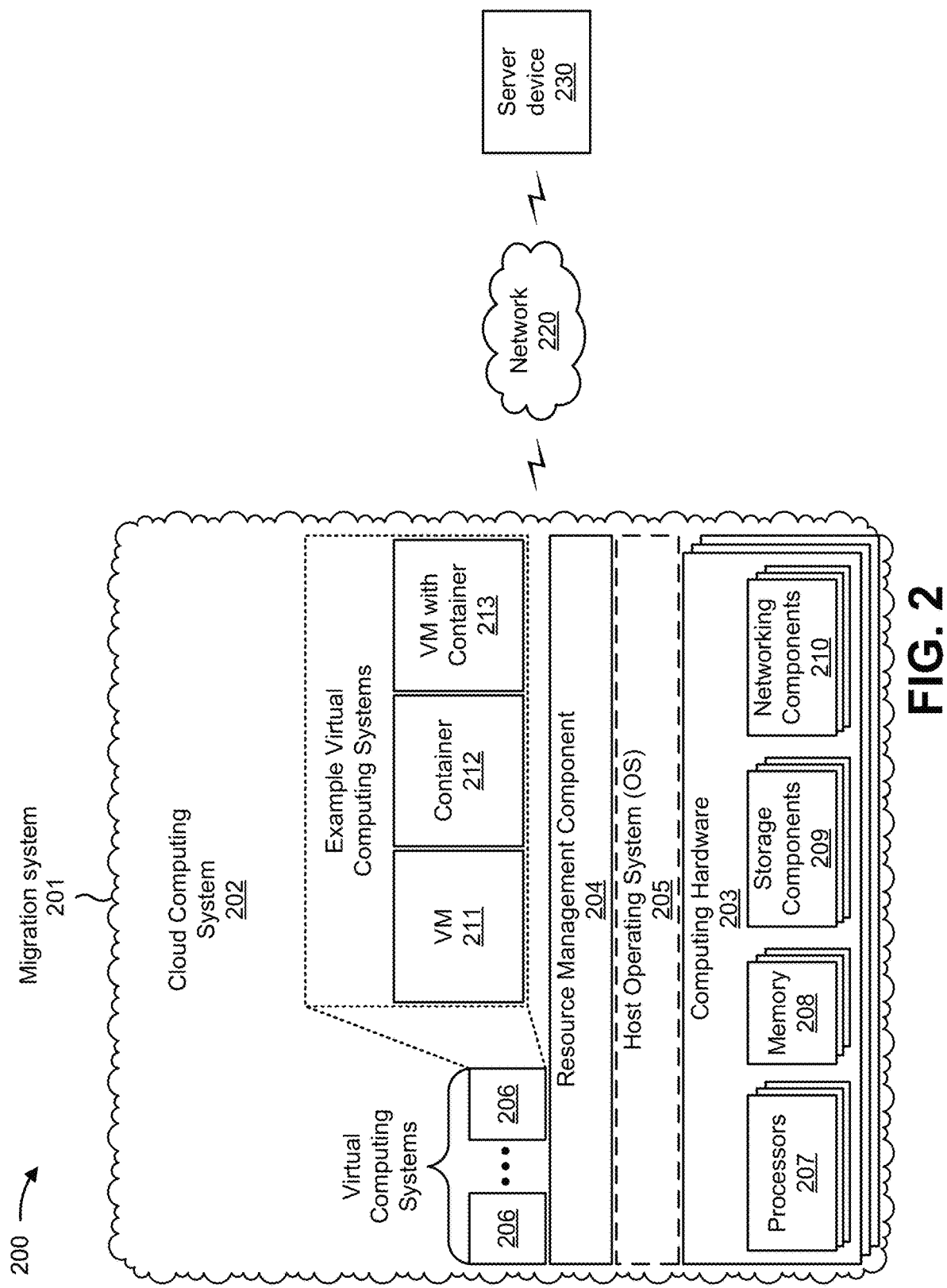

UTILIZING MULTIPLE ANALYSES TO MIGRATE AN APPLICATION TO A CLOUD COMPUTING ENVIRONMENT

BACKGROUND

An application, such as a legacy web application lacks multiple features such as scalability, operability, security, maintenance and/or the like compared to a modern cloud-based application.

SUMMARY

Some implementations described herein relate to a method for generating a migration strategy for source code and a database to be migrated to a cloud computing environment. The method may include receiving the source code and the database to be migrated to the cloud computing environment and performing a first stage analysis of the source code to generate a first report. The method may include causing a second stage analysis of the source code to be performed based on the first report and to generate refactored and rewritten code, and performing a third stage analysis of the database to generate a second report. The method may include causing a fourth stage analysis of the database to be performed based on the second report and to generate a refactored and rewritten database, and validating the refactored and rewritten code and the refactored and rewritten database. The method may include performing the first stage analysis of the refactored and rewritten code and the third stage analysis of the refactored and rewritten database to generate a final report, and generating a migration strategy for the refactored and rewritten code and the refactored and rewritten database based on the final report. The method may include performing one or more actions based on the migration strategy.

Some implementations described herein relate to a device. The device may include one or more memories and one or more processors coupled to the one or more memories. The one or more processors may be configured to receive source code and a database to be migrated to a cloud computing environment, and perform a validation of the source code and a validation of access to the database. The one or more processors may be configured to perform a first stage analysis of the source code to generate a first report, and cause a second stage analysis of the source code to be performed based on the first report and to generate refactored and rewritten code. The one or more processors may be configured to perform a third stage analysis of the database to generate a second report, and cause a fourth stage analysis of the database to be performed based on the second report and to generate a refactored and rewritten database. The one or more processors may be configured to validate the refactored and rewritten code and the refactored and rewritten database, and perform the first stage analysis of the refactored and rewritten code and the third stage analysis of the refactored and rewritten database to generate a final report. The one or more processors may be configured to generate a migration strategy for the refactored and rewritten code and the refactored and rewritten database based on the final report, and perform one or more actions based on the migration strategy.

Some implementations described herein relate to a non-transitory computer-readable medium that stores a set of instructions. The set of instructions, when executed by one or more processors of a device, may cause the device to receive source code and a database to be migrated to a cloud computing environment, and perform a first stage analysis of the source code to generate a first report. The set of instructions, when executed by one or more processors of the device, may cause the device to cause a second stage analysis of the source code to be performed based on the first report and to generate refactored and rewritten code, and perform a third stage analysis of the database to generate a second report. The set of instructions, when executed by one or more processors of the device, may cause the device to cause a fourth stage analysis of the database to be performed based on the second report and to generate a refactored and rewritten database, and validate the refactored and rewritten code and the refactored and rewritten database. The set of instructions, when executed by one or more processors of the device, may cause the device to perform the first stage analysis of the refactored and rewritten code and the third stage analysis of the refactored and rewritten database to generate a final report, and generate a migration strategy for the refactored and rewritten code and the refactored and rewritten database based on the final report. The set of instructions, when executed by one or more processors of the device, may cause the device to migrate the refactored and rewritten code and the refactored and rewritten database to the cloud computing environment based on the migration strategy.

BRIEF DESCRIPTION OF THE DRAWINGS

FIG. 2 is a diagram of an example environment in which systems and/or methods described herein may be implemented.

DETAILED DESCRIPTION

Figure 1A:
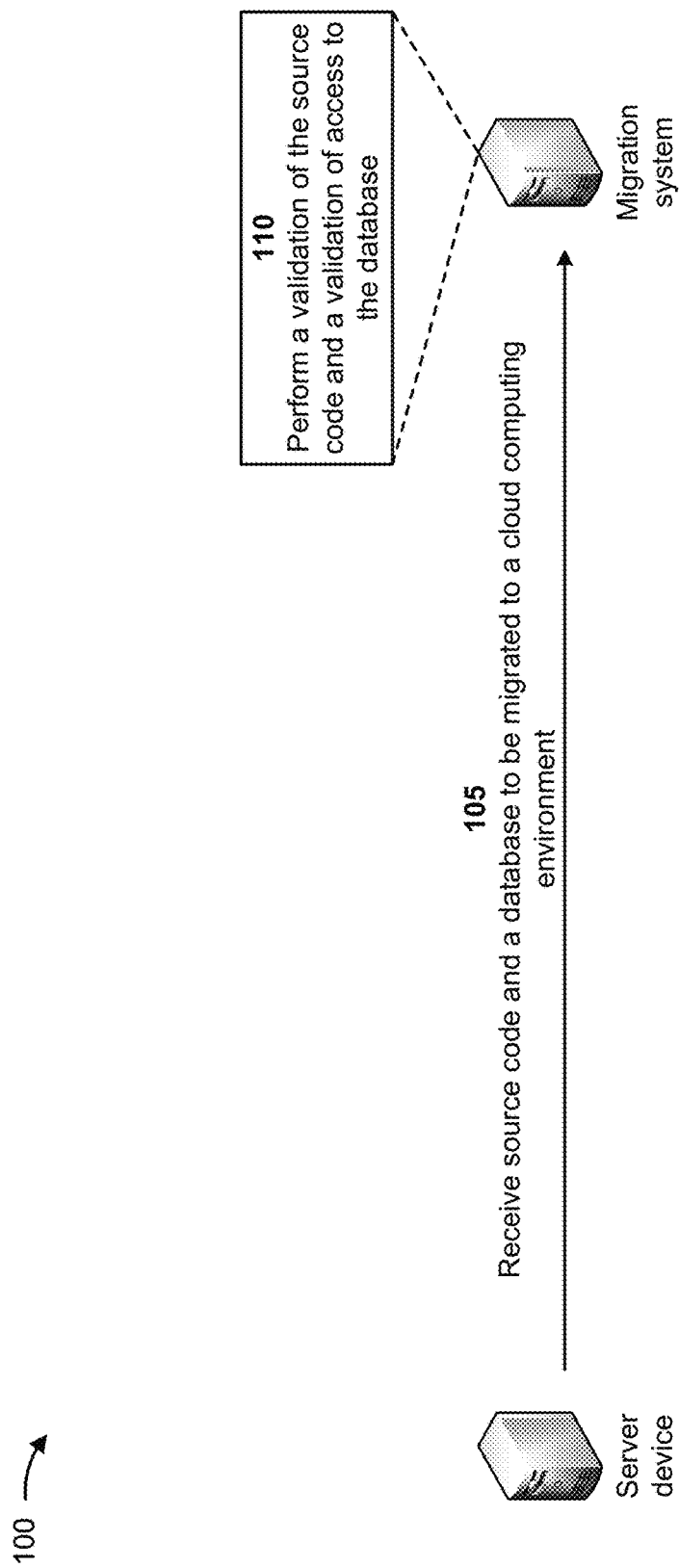
FIGS. 1A-1H are diagrams of an example implementation described herein.

The following detailed description of example implementations refers to the accompanying drawings. The same reference numbers in different drawings may identify the same or similar elements.

Determining whether an application can be viably migrated to a cloud computing environment requires an assessment that may be manually impossible to perform due to lack of transparency of usage by various users and unavailability of a centralized repository where application artifacts are hosted. The application may have been executing for years, may have no centralized governance, and may include an outdated infrastructure with resources requiring various skillsets resulting in high capital and operational expenditures. Furthermore, comparing a cost of operating the application and a value delivered by the application may be impossible since the application may perform data processing rather than generate insights. The application may be difficult or impossible to monitor due to a distributed nature of the application, the lack of centralized governance, and application developers moving into different roles or jobs. Therefore, current techniques for assessing an application and/or migrating an application to a cloud computing environment consume computing resources (e.g., processing resources, memory resources, communication resources, and/or the like), networking resources, and/or the like associated with failing to properly assess whether the application can be viably migrated to a cloud computing environment, spending time and money and other resources on migration of a non-functional application to the cloud computing environment, attempting and failing to migrate the application to the cloud computing environment, and/or the like.

A legacy application may operate more efficiently in a cloud computing environment and may be migrated to the cloud computing environment based on implementations described herein. Some implementations described herein relate to a migration system that utilizes multiple analyses to migrate an application to a cloud computing environment. For example, the migration system may receive source code and/or a database to be migrated to a cloud computing environment and may performing a first analysis of the legacy application's source code and/or database to generate a compatibility report indicating whether the legacy application's source code and/or database are compatible for cloud migration. The analysis for generation of the compatibility report may include execution of four stages (e.g., stages 1 through 4), where stages 1 and 3 may be executed by the migration system in parallel and stages 2 and 4 may be performed by an owner of the legacy application since the legacy application may require code rewriting and refactoring which may be customized based on a client's ecosystem. The compatibility report generation may require execution of multiple models by the migration system in order to evaluate the source code and/or the database compatibility for cloud migration. The source code and/or the database may be rewritten and refactored by the owner of the legacy application based on the compatibility report generated in the first stage of the analysis. The migration system may revalidate the refactored and rewritten source code and/or database in a fifth stage to ensure that the source code and/or the database is cloud compatible, and may generate a final compatibility report that assures that the source code and/or the database is compatible for the migration. The migration system may generate a migration strategy for the refactored and rewritten source code and the refactored and rewritten database based on the final compatibility report, and may perform one or more actions based on the migration strategy.

In this way, the migration system utilizes multiple analyses to migrate an application to a cloud computing environment. The migration system may provide insight into whether a legacy application is capable of being migrated and transformed into a cloud-based application. The migration system may provide an end-to-end solution for refactoring and reverse engineering the legacy application and may provide an analysis of a database associated with the legacy application. The migration system may generate a detailed summary identifying whether different components of the legacy application are capable of being migrated to the cloud computing environment. The migration system may also provide effective strategies for migrating the legacy application based on refactoring the application and the database for migration to the cloud computing movement. This, in turn, conserves computing resources, networking resources, and/or the like that would otherwise have been consumed in failing to properly assess whether the application can be viably migrated to a cloud computing environment, spending time and money and other resources on migration of a non-functional application to the cloud computing environment, attempting and failing to migrate the application to the cloud computing environment, and/or the like.

FIGS. 1A-1H are diagrams of an example 100 associated with utilizing multiple analyses to migrate an application to a cloud computing environment. As shown in FIGS. 1A-1H, example 100 includes a migration system associated with a server device. The migration system may include a system that utilizes multiple analyses to migrate an application to a cloud computing environment. Further details of the migration system and the server device are provided elsewhere herein.

As shown in FIG. 1A, and by reference number 105, the migration system may receive source code and a database to be migrated to a cloud computing environment. For example, an application, such as a legacy application, may operate more efficiently in a cloud computing environment, may be terminated due to being obsolete, and/or the like. The migration system may determine whether the application may be migrated to a cloud computing environment and function correctly in the cloud computing environment. The migration system may receive source code and a database associated with the application from one or more server devices executing the application, one or more data structures storing the source code and the database of the application, and/or the like. In some implementations, the migration system may continuously receive the source code and the database from the server device, may periodically receive the source code and the database from the server device, may receive the source code and the database based on requesting the source code and the database from the server device, and/or the like.

The source code may include programming statements that are created by a programmer with a text editor or a visual programming tool and then saved in a file. The source code may be compiled, with a compiler, to generate a compiled file (e.g., an object code file) that includes a sequence of machine-readable instructions. The sequence of machine-readable instructions, when executed, may perform functions associated with the application. The database may include logs and/or files associated with application. In some implementations, the logs may include load sharing facility (LSF) logs, workspace server logs, store process logs, batch server logs, and/or the like. The files may include execution log files associated with the application. In some implementations, the files may include data identifying file names, file paths, execution times of the files, users of the files, and/or the like.

As further shown in FIG. 1A, and by reference number 110, the migration system may perform a validation of the source code and a validation of access to the database. For example, the migration system may perform a validation of the source code by performing a static code analysis of the source code, a dynamic code analysis of the source code, and/or the like. Static code analysis may include examining the source code without executing the source code. The static code analysis may provide an understanding of the source code structure and may ensure that the source code adheres to industry standards. A static code analysis tool may scan the source code to check for vulnerabilities while validating the source code. Dynamic code analysis may include an analysis of the source code during execution of the source code. The dynamic code analysis may include a code coverage analysis of the source code, a memory error detection analysis of the source code, a fault localization analysis of the source code, an invariant inference analysis of the source code, a security analysis of the source code, a concurrency errors analysis of the source code, a program slicing analysis of the source code, a performance analysis of the source code, and/or the like. In some implementations, the migration system may validate the source code prior to modifying the source code for migration to the cloud computing environment.

The migration system may also validate access to the database associated with the source code and the application. For example, the migration system may ensure that the migration system can access the database, may validate the information included in the database (e.g., to identify corrupt data, impartial data, and/or the like), may eliminate duplicate information included in the database, and/or the like. In some implementations, the migration system may perform a data validation of data included in the database. Data validation may include checking an integrity, an accuracy, and a structure of data before the data is used for a business operation (e.g., data analytics, business intelligence, training a machine learning model, and/or the like). In some implementations, the migration system may validate the database prior to modifying the database for migration to the cloud computing environment.

Figure 1B:
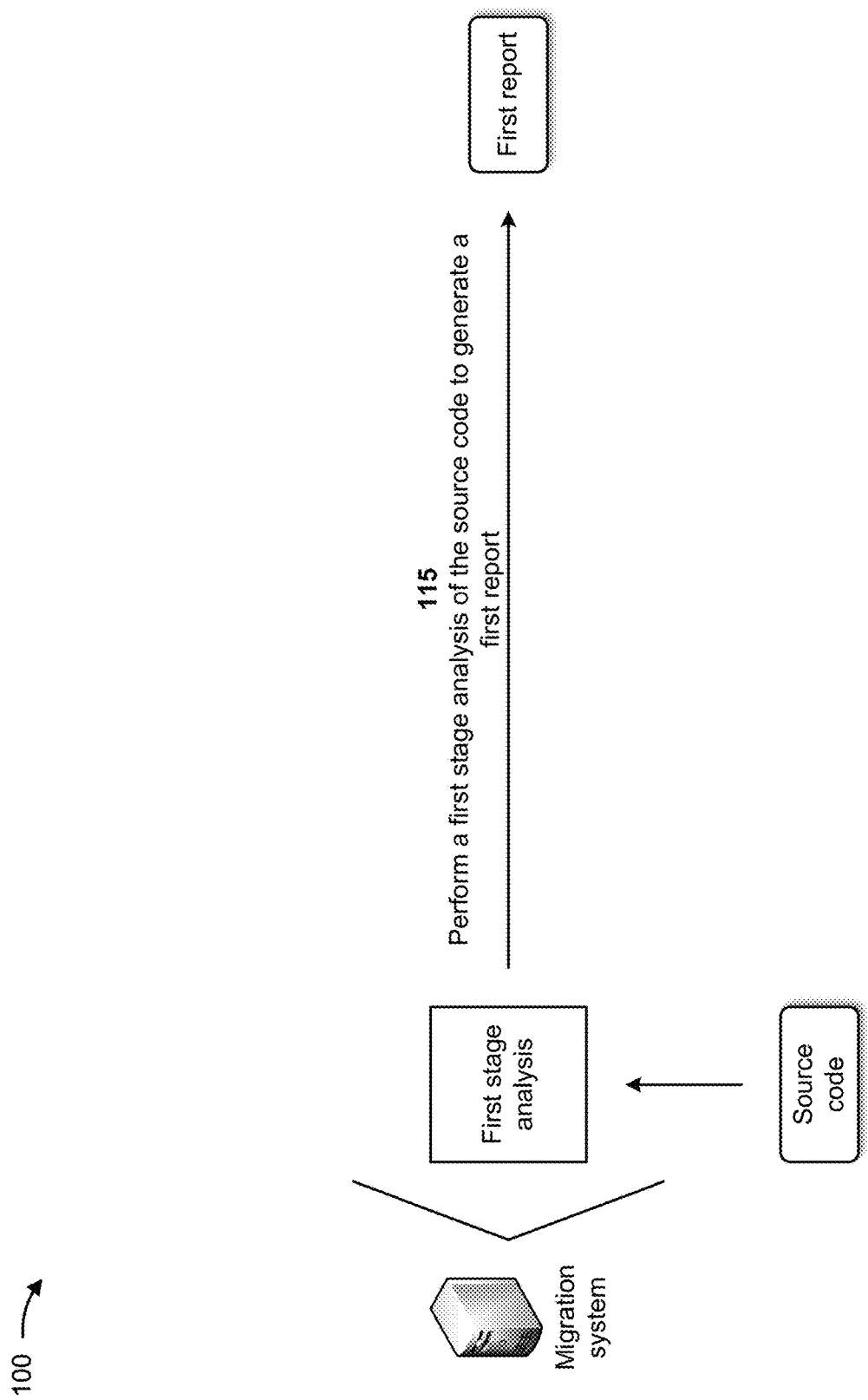

As shown in FIG. 1B, and by reference number 115, the migration system may perform a first stage analysis of the source code to generate a first report. For example, the migration system may perform the first stage analysis of the source code to generate analysis results, and may utilize the analysis results to generate the first report. In some implementations, when performing the first stage analysis of the source code, the migration system may identify components of the source code, such as functions, descriptions, definitions, calls, methods, variables, constants, and other operational statements of the source code. When performing the first stage analysis of the source code, the migration system may calculate a technical quality of the source code (or the components of the source code) in parallel with identifying the components of the source code. In some implementations, the migration system may perform a technical analysis of the source code to calculate the technical quality of the source code. The technical analysis may include a continuous inspection of source code quality to detect bugs and other quality issues associated with the source code.

In some implementations, when performing the first stage analysis of the source code, the migration system may filter the source code (or the components of the source code) in parallel with identifying the components of the source code and/or with performing the technical analysis of the source code. The migration system may filter the source code to identify classes, interfaces, dependencies, and/or the like associated with the components of the source code. In some implementations, when performing the first stage analysis of the source code, the migration system may perform a refactoring analysis of the source code (or the components of the source code) in parallel with identifying the components of the source code, with performing the technical analysis of the source code, and/or with filtering the source code. The migration system may perform the refactoring analysis of the source code to generate refactoring results. The refactoring analysis may include an analysis that determines whether the source code can be refactored (e.g., restructuring or changing the factoring without changing an external behavior of the source code). In some implementations, when performing the first stage analysis of the source code, the migration system may generate the first report to identify the technical quality of the source code; the classes, the interfaces, or the dependencies associated with the source code; and the refactoring results.

Figure 1C:
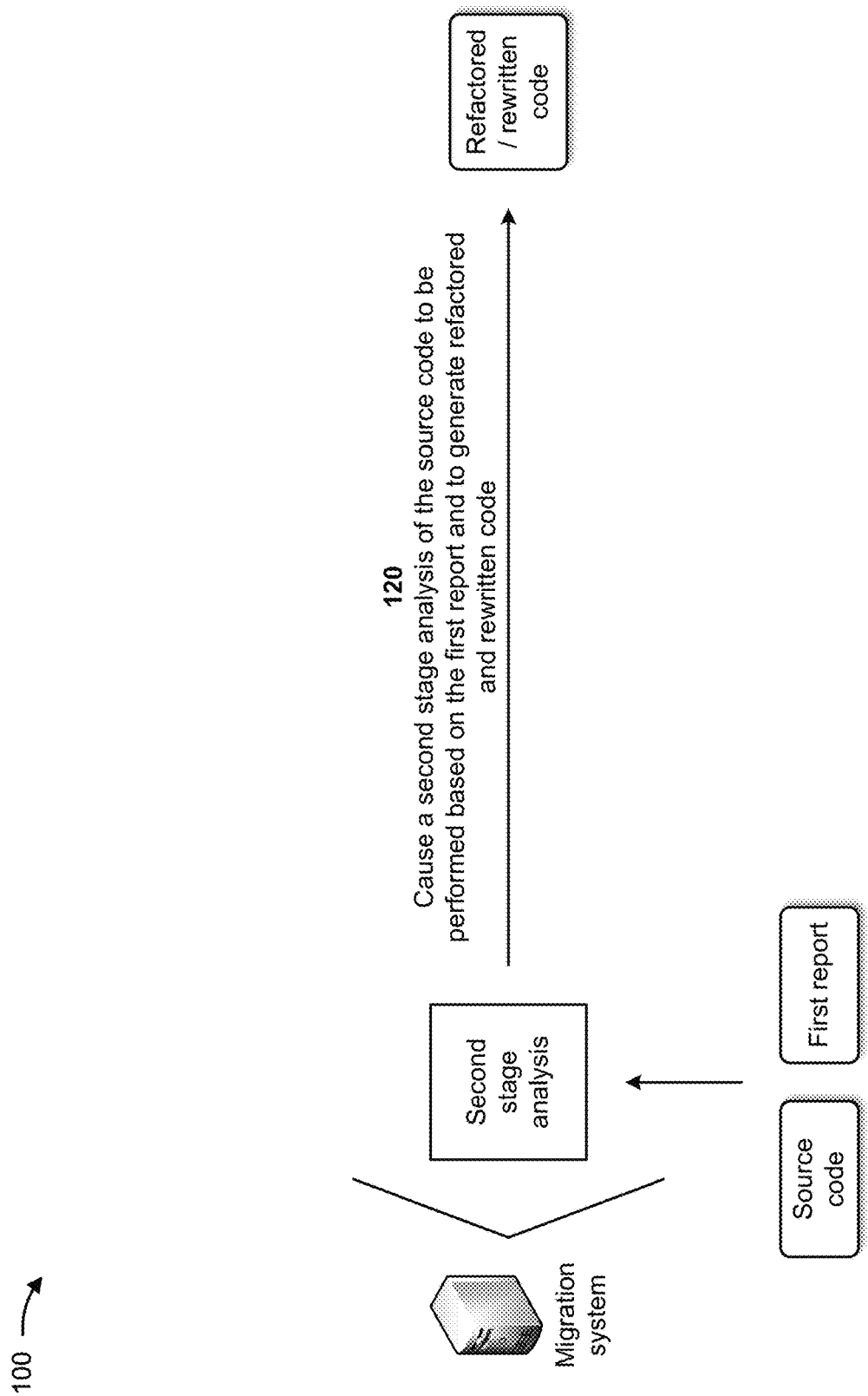

As shown in FIG. 1C, and by reference number 120, the migration system may cause a second stage analysis of the source code to be performed based on the first report and to generate refactored and rewritten code. For example, the migration system may utilize the first report to cause the second stage analysis of the source code to be performed. The second stage analysis may generate the refactored and rewritten code. In some implementations, when causing the second stage analysis of the source code to be performed based on the first report and to generate the refactored and rewritten code, the migration system may cause the source code to be refactored based on the first report and to generate refactored code. For example, the migration system may cause the source code to be refactored by restructuring the source code (e.g., changing the factoring of the source code without changing an external behavior of the source code). Refactoring may improve a design, a structure, and/or an implementation of the source code, while preserving functionality of the source code.

In some implementations, when causing the second stage analysis of the source code to be performed based on the first report and to generate the refactored and rewritten code, the migration system may cause the refactored code to be rewritten based on the first report and to generate the refactored and rewritten code. For example, the migration system may cause the refactored code to be rewritten to conform to code requirements of the cloud computing environment and to generate the refactored and rewritten code.

Figure 1D:
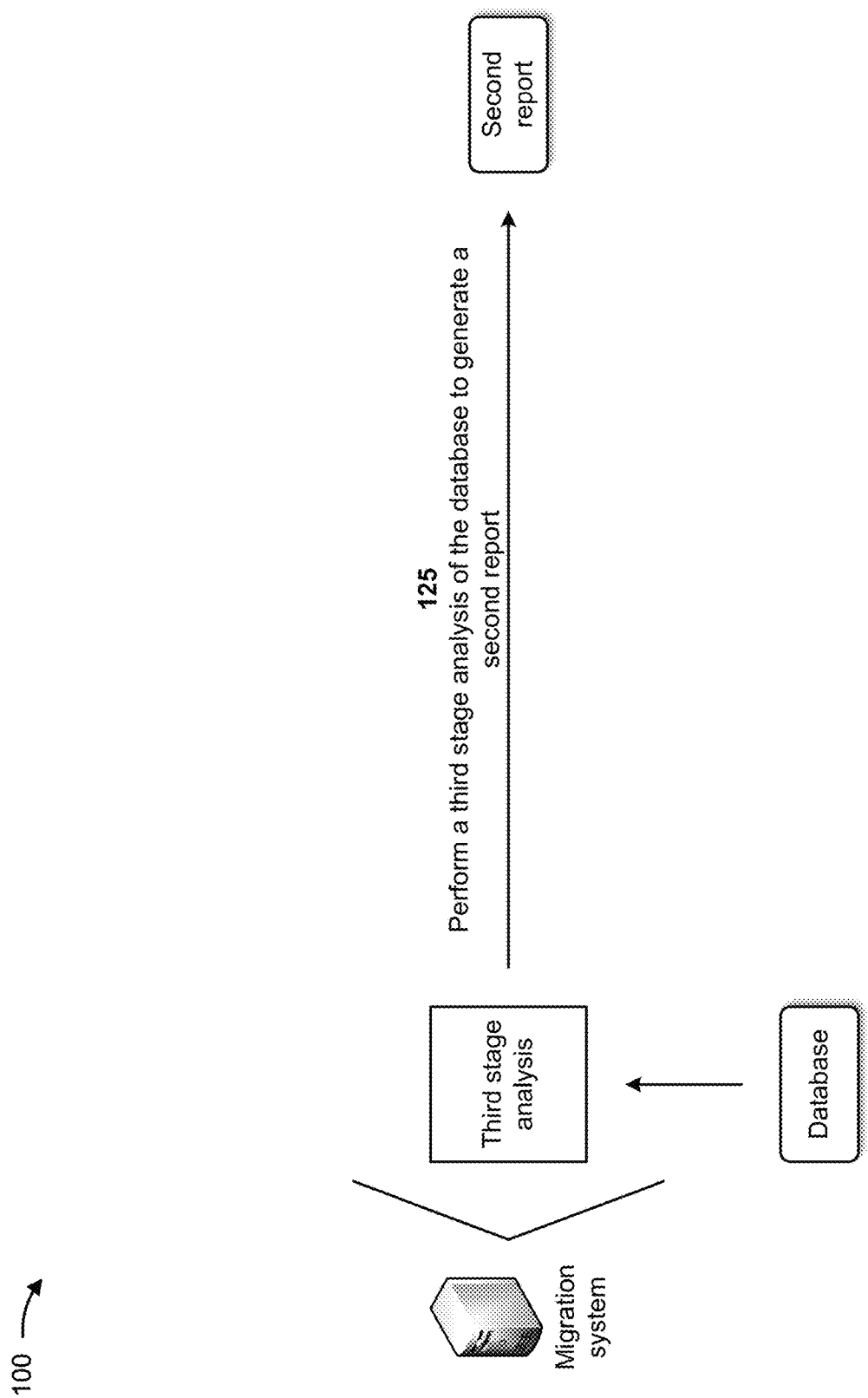

As shown in FIG. 1D, and by reference number 125, the migration system may perform a third stage analysis of the database to generate a second report. For example, the migration system may perform the third stage analysis of the database to generate analysis results, and may utilize the analysis results to generate the second report. In some implementations, when performing the third stage analysis of the database, the migration system may identify components of the database, such as a database schema, schema objects, indexes, tables, fields and columns, records and rows, keys, relationships, and/or the like. When performing the third stage analysis of the database, the migration system may perform a refactoring analysis of the components of the database to generate refactoring results. The refactoring analysis may include an analysis that determines whether the database can be refactored (e.g., restructured to change factoring without changing an external behavior of the database). In some implementations, when performing the third stage analysis of the database, the migration system may generate the second report identifying the components of the database and the refactoring results.

Figure 1E:
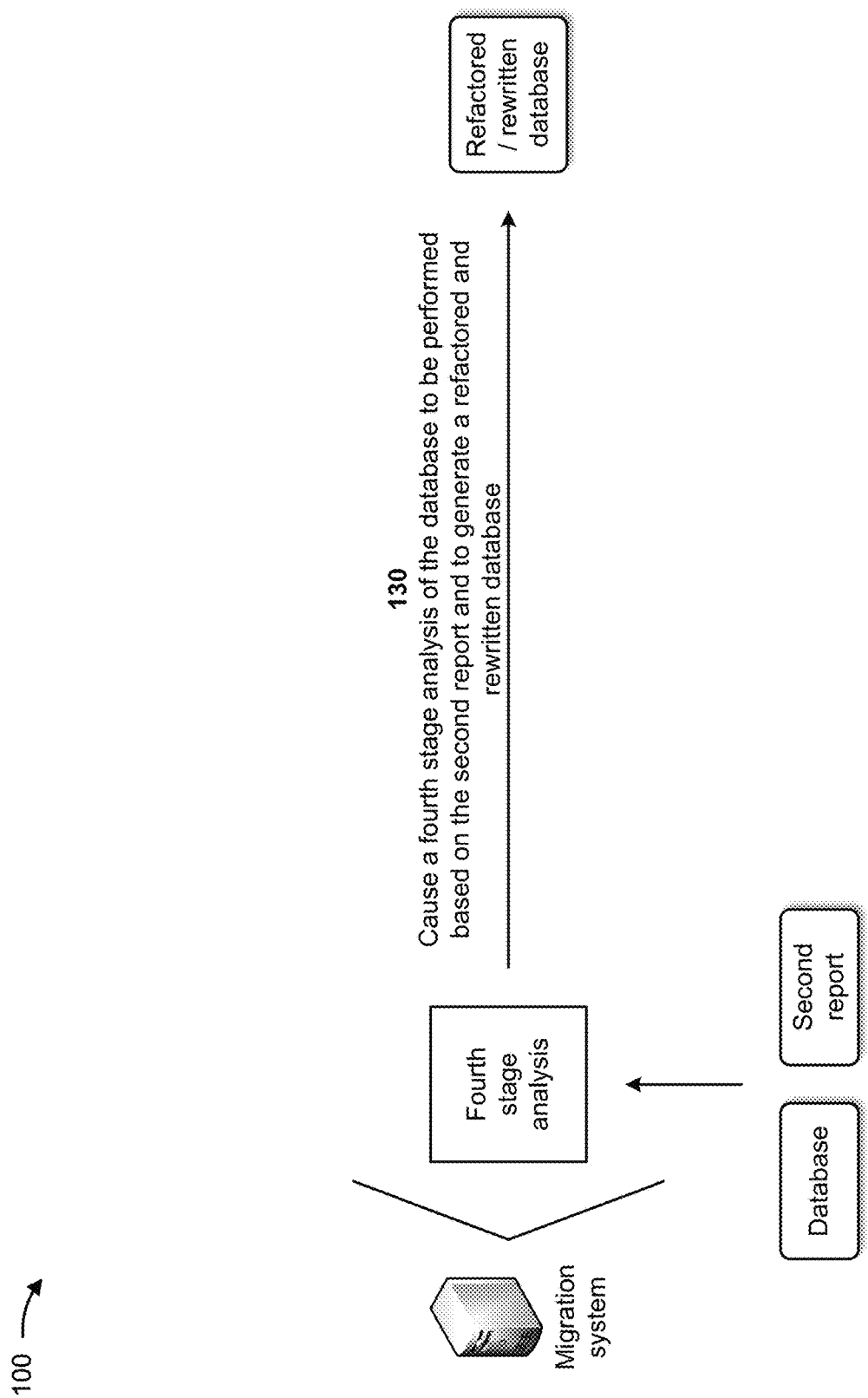

As shown in FIG. 1E, and by reference number 130, the migration system may cause a fourth stage analysis of the database to be performed based on the second report and to generate a refactored and rewritten database. For example, the migration system may utilize the second report to cause the fourth stage analysis of the database to be performed. The fourth stage analysis may generate the refactored and rewritten database. In some implementations, when causing the fourth stage analysis of the database to be performed based on the second report and to generate the refactored and rewritten database, the migration system may cause the database to be refactored based on the second report and to generate a refactored database. For example, the migration system may cause the database to be refactored by restructuring the database (e.g., changing the factoring of the database without changing an external behavior of the database). Refactoring may improve a design, a structure, and/or an implementation of the database, while preserving functionality of the database.

In some implementations, when causing the fourth stage analysis of the database to be performed based on the second report and to generate the refactored and rewritten database, the migration system may cause the refactored database to be rewritten based on the second report and to generate the refactored and rewritten database. For example, the migration system may cause the refactored database to be rewritten to conform to database requirements of the cloud computing environment and to generate the refactored and rewritten database. In some implementations, the migration system may perform the first stage analysis and the third stage analysis in parallel and separate from each other. In some implementations, the migration system may cause the second stage analysis and the fourth stage analysis to be performed in parallel and separate from each other.

Figure 1F:
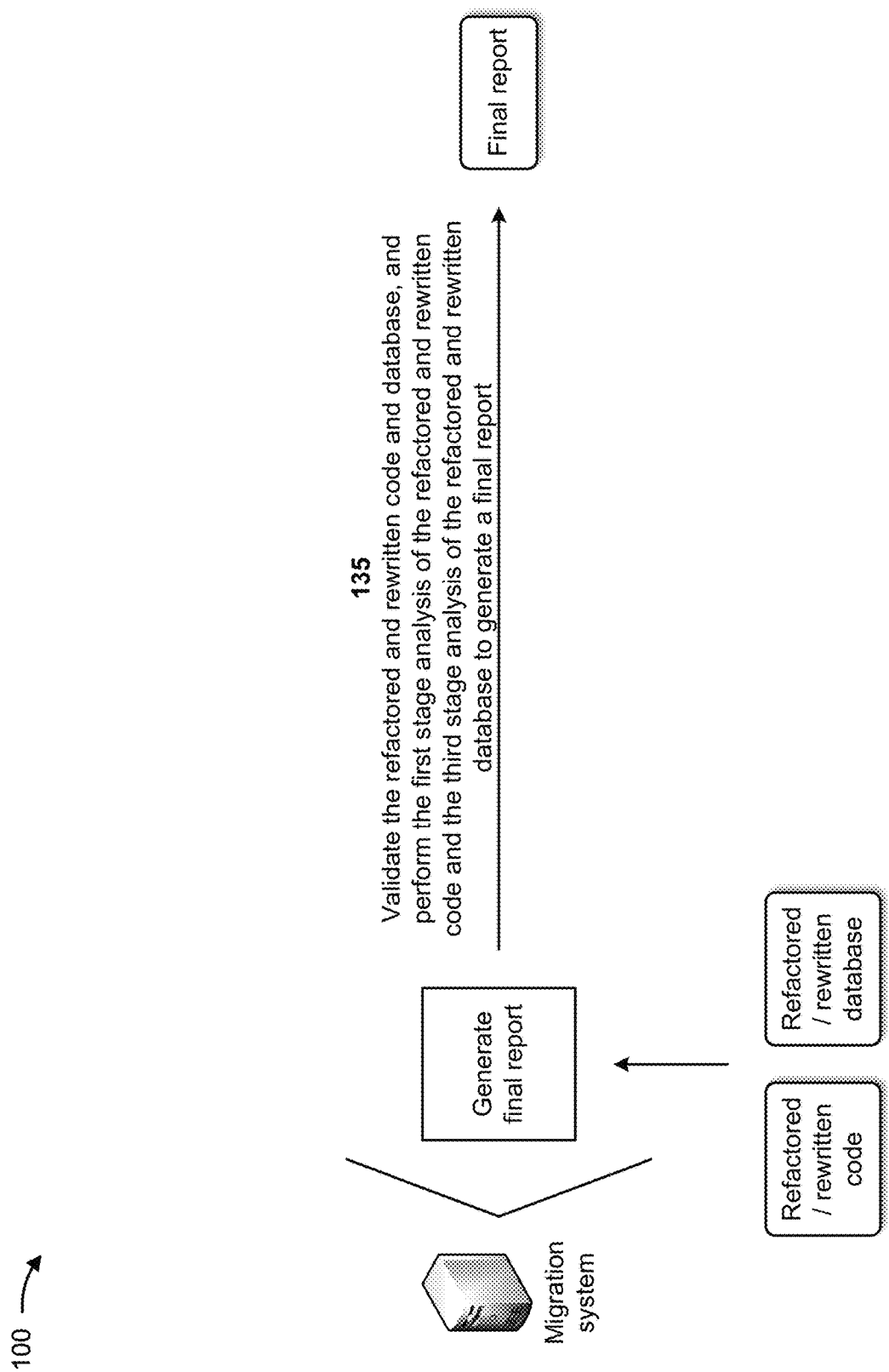

As shown in FIG. 1F, and by reference number 135, the migration system may validate the refactored and rewritten code and database, and may perform the first stage analysis of the refactored and rewritten code and the third stage analysis of the refactored and rewritten database to generate a final report. For example, the migration system may perform a validation of the refactored and rewritten code by performing a static code analysis of the refactored and rewritten code, a dynamic code analysis of the refactored and rewritten code, and/or the like. Static code analysis may include examining the refactored and rewritten code without executing the refactored and rewritten code. The static code analysis may provide an understanding of the refactored and rewritten code structure and may ensure that the refactored and rewritten code adheres to industry standards. A static code analysis tool may scan the refactored and rewritten code to check for vulnerabilities while validating the refactored and rewritten code. Dynamic code analysis may include an analysis of the refactored and rewritten code during execution of the refactored and rewritten code. The dynamic code analysis may include a code coverage analysis of the refactored and rewritten code, a memory error detection analysis of the refactored and rewritten code, a fault localization analysis of the refactored and rewritten code, an invariant inference analysis of the refactored and rewritten code, a security analysis of the refactored and rewritten code, a concurrency errors analysis of the refactored and rewritten code, a program slicing analysis of the refactored and rewritten code, a performance analysis of the refactored and rewritten code, and/or the like.

The migration system may also validate the refactored and rewritten database. For example, the migration system may validate the information included in the refactored and rewritten database (e.g., to identify corrupt data, impartial data, and/or the like), may eliminate duplicate information included in the refactored and rewritten database, and/or the like. In some implementations, the migration system may perform a data validation of data included in the refactored and rewritten database. Data validation may include checking an integrity, an accuracy, and a structure of data included in the refactored and rewritten database.

The migration system may perform the first stage analysis of the refactored and rewritten code to generate analysis results, and may utilize the analysis results to generate a first portion of the final report. In some implementations, when performing the first stage analysis of the refactored and rewritten code, the migration system may identify components of the refactored and rewritten code, such as functions, descriptions, definitions, calls, methods, variables, constants, and other operational statements of the refactored and rewritten code. When performing the first stage analysis of the refactored and rewritten code, the migration system may calculate a technical quality of the refactored and rewritten code (or the components of the refactored and rewritten code) in parallel with identifying the components of the refactored and rewritten code. In some implementations, the migration system may perform a technical analysis of the refactored and rewritten code to calculate the technical quality of the refactored and rewritten code. The technical analysis may include a continuous inspection of the refactored and rewritten code quality to detect bugs and other quality issues associated with the refactored and rewritten code.

In some implementations, when performing the first stage analysis of the refactored and rewritten code, the migration system may filter the refactored and rewritten code (or the components of the refactored and rewritten code) in parallel with identifying the components of the refactored and rewritten code and/or with performing the technical analysis of the refactored and rewritten code. The migration system may filter the refactored and rewritten code to identify classes, interfaces, dependencies, and/or the like associated with the components of the refactored and rewritten code. In some implementations, when performing the first stage analysis of the refactored and rewritten code, the migration system may perform a refactoring analysis of the refactored and rewritten code (or the components of the refactored and rewritten code) in parallel with identifying the components of the refactored and rewritten code, with performing the technical analysis of the refactored and rewritten code, and/or with filtering the refactored and rewritten code. The migration system may perform the refactoring analysis of the refactored and rewritten code to generate refactoring results. The refactoring analysis may include an analysis that determines whether the refactored and rewritten code can be refactored (e.g., restructured to change factoring without changing an external behavior of the refactored and rewritten code). In some implementations, when performing the first stage analysis of the refactored and rewritten code, the migration system may generate the first portion of the final report to identify the technical quality of the refactored and rewritten code; the classes, the interfaces, or the dependencies associated with the refactored and rewritten code; and the refactoring results.

The migration system may perform the third stage analysis of the refactored and rewritten database to generate analysis results, and may utilize the analysis results to generate a second portion of the final report. In some implementations, when performing the third stage analysis of the refactored and rewritten database, the migration system may identify components of the refactored and rewritten database, such as a database schema, schema objects, indexes, tables, fields and columns, records and rows, keys, relationships, and/or the like. When performing the third stage analysis of the refactored and rewritten database, the migration system may perform a refactoring analysis of the components of the refactored and rewritten database to generate refactoring results. The refactoring analysis may include an analysis that determines whether the refactored and rewritten database can be refactored (e.g., restructured to change factoring without changing an external behavior of the refactored and rewritten database). In some implementations, when performing the third stage analysis of the refactored and rewritten database, the migration system may generate the second portion of the final report identifying the components of the refactored and rewritten database and the refactoring results. In some implementations, the migration system may combine the first portion of the final report and the second portion of the final report to generate the final report.

Figure 1G:
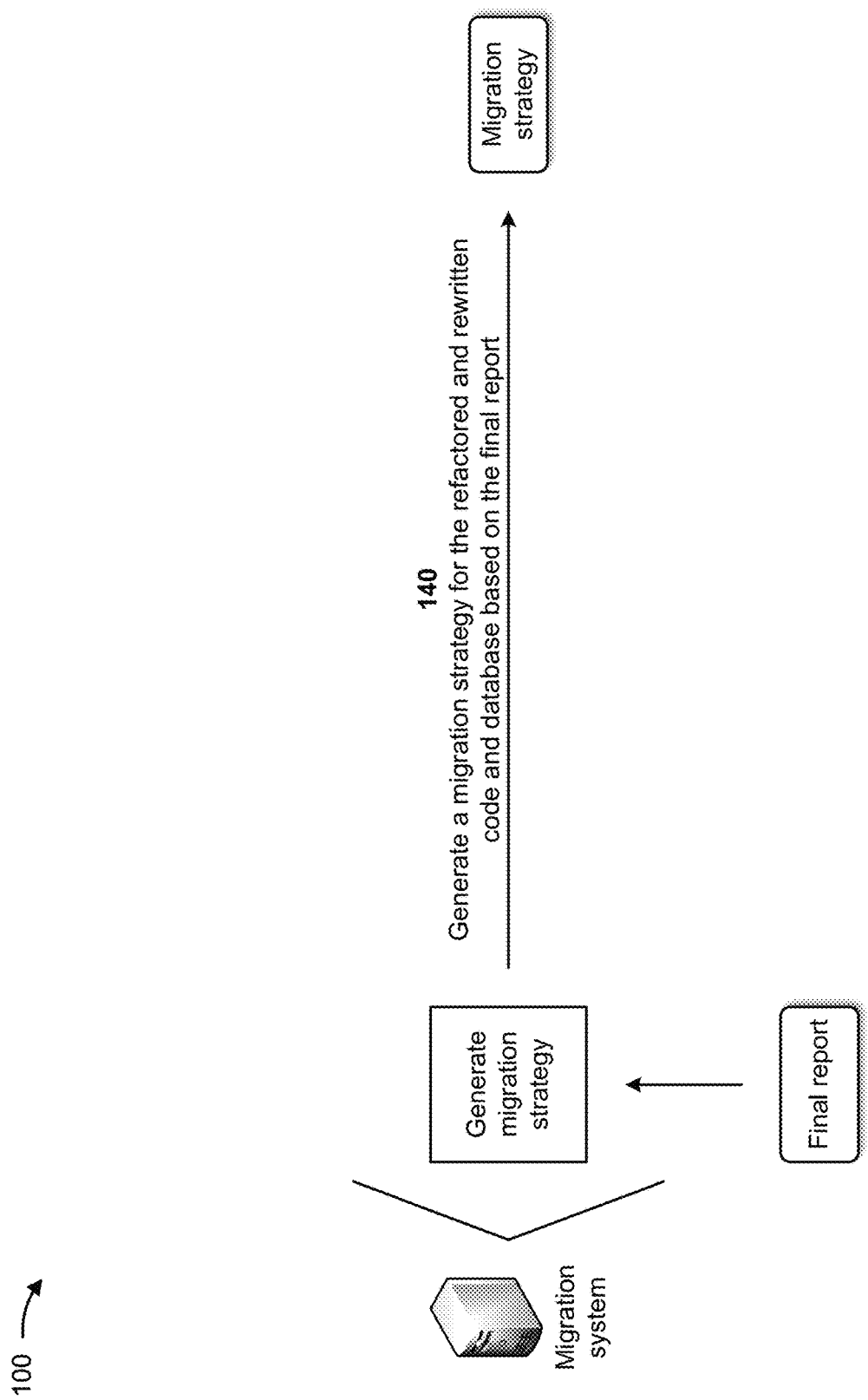

As shown in FIG. 1G, and by reference number 140, the migration system may generate a migration strategy for the refactored and rewritten code and database based on the final report. For example, the migration system may generate a migration strategy indicating how to migrate the refactored and rewritten code and the refactored and rewritten database to the cloud computing environment. In some implementations, when generating the migration strategy for the refactored and rewritten code and the refactored and rewritten database based on the final report, the migration system may generate a proposed migration strategy for migrating the refactored and rewritten code and the refactored and rewritten database to the cloud computing environment, based on the final report. The migration system may provide the proposed migration strategy for display to a user of the migration system, and may receive input (e.g., changes, additions, deletions, and/or the like) associated with the proposed migration strategy from the user of the migration system. The migration system may generate the migration strategy for the refactored and rewritten code and the refactored and rewritten database based on the proposed migration strategy and the input.

Figure 1H:
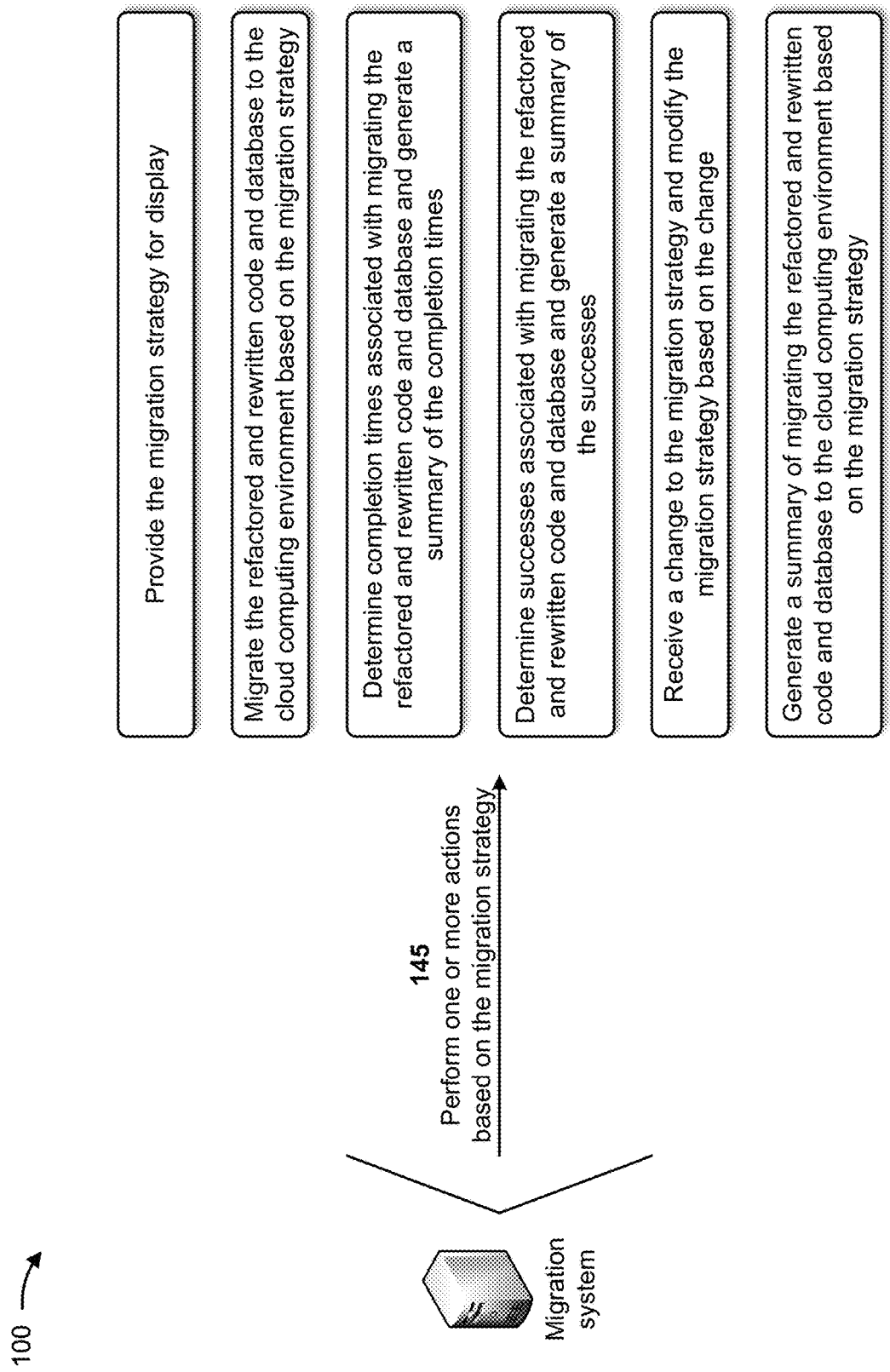

As shown in FIG. 1H, and by reference number 145, the migration system may perform one or more actions based on the migration strategy. In some implementations, performing the one or more actions includes the migration system providing the migration strategy for display. For example, the migration system may provide the migration strategy for display to a user of the migration system. The user may then manage (e.g., modify) the migration strategy based on the display. In this way, the migration system conserves computing resources, networking resources, and/or the like that would otherwise have been consumed in failing to accurately assess whether the source code and the database can be viably migrated to a cloud computing environment.

In some implementations, performing the one or more actions includes the migration system migrating the refactored and rewritten code and database to the cloud computing environment based on the migration strategy. For example, the migration system may utilize the migration strategy to migrate the refactored and rewritten code and the refactored and rewritten database to the cloud computing environment. In some implementations, when migrating the refactored and rewritten code and the refactored and rewritten database to the cloud computing environment, the migration system may reuse one or more components of the refactored and rewritten code and the refactored and rewritten database in the cloud computing environment, may write one or more components of the refactored and rewritten code and the refactored and rewritten database in the cloud computing environment, may deploy one or more components of the refactored and rewritten code and the refactored and rewritten database in the cloud computing environment, may generate outputs associated with migrating the refactored and rewritten code and the refactored and rewritten database to the cloud computing environment, and/or the like. In this way, the migration system conserves computing resources, networking resources, and/or the like that would otherwise have been consumed in spending time and money and other resources on migration of a non-functional application to the cloud computing environment.

In some implementations, performing the one or more actions includes the migration system determining completion times associated with migrating the refactored and rewritten code and database and generating a summary of the completion times. For example, the migration system may migrate the refactored and rewritten code and the refactored and rewritten database to the cloud computing environment in stages, and may determine completion times associated with completion of the stages. The migration system may provide the completion times for display to the user of the migration system. In this way, the migration system conserves computing resources, networking resources, and/or the like that would otherwise have been consumed in attempting and failing to migrate the application to the cloud computing environment.

In some implementations, performing the one or more actions includes the migration system determining successes associated with migrating the refactored and rewritten code and database and generating a summary of the successes. For example, the migration system may migrate the refactored and rewritten code and the refactored and rewritten database to the cloud computing environment in stages, and may determine successes associated with completion of the stages (e.g., whether a stage is successfully completed). The migration system may provide the successes for display to the user of the migration system. In this way, the migration system conserves computing resources, networking resources, and/or the like that would otherwise have been consumed in attempting and failing to migrate the application to the cloud computing environment.

In some implementations, performing the one or more actions includes the migration system receiving a change to the migration strategy and modifying the migration strategy based on the change. For example, the migration system may receive a change to the migration strategy from the user of the migration system. The change may indicate that only a portion of the refactored and rewritten source code is to be migrated rather than the entire refactored and rewritten source code. The migration system may update the migration strategy so that only the portion of the refactored and rewritten source code is migrated during the migration of the refactored and rewritten source code and the refactored and rewritten database to the cloud computing environment. In this way, the migration system conserves computing resources, networking resources, and/or the like that would otherwise have been consumed in failing to properly assess whether the application can be viably migrated to a cloud computing environment.

In some implementations, performing the one or more actions includes the migration system generating a summary of migrating the refactored and rewritten code and database to the cloud computing environment based on the migration strategy. For example, the migration system may generate a summary identifying completion times associated with migrating the refactored and rewritten code and the refactored and rewritten database to the cloud computing environment, successes associated with migrating the refactored and rewritten code and the refactored and rewritten database to the cloud computing environment, and/or the like. The migration system may provide the summary for display to the user of the migration system. In this way, the migration system conserves computing resources, networking resources, and/or the like that would otherwise have been consumed in spending time and money and other resources on migration of a non-functional application to the cloud computing environment.

In this way, the migration system utilizes multiple analyses to migrate an application to a cloud computing environment. The migration system may provide insight into whether a legacy application is capable of being migrated and transformed into a cloud-based application. The migration system may provide an end-to-end solution for refactoring and reverse engineering the legacy application and may provide an analysis of a database associated with the legacy application. The migration system may generate a detailed summary identifying whether different components of the legacy application are capable of being migrated to the cloud computing environment. The migration system may also provide effective strategies for migrating the legacy application based on refactoring the application and the database for migration to the cloud computing movement. This, in turn, conserves computing resources, networking resources, and/or the like that would otherwise have been consumed in failing to properly assess whether the application can be viably migrated to a cloud computing environment, spending time and money and other resources on migration of a non-functional application to the cloud computing environment, attempting and failing to migrate the application to the cloud computing environment, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

FIG. 2 is a diagram of an example environment 200 in which systems and/or methods described herein may be implemented. As shown in FIG. 2, the environment 200 may include a migration system 201, which may include one or more elements of and/or may execute within a cloud computing system 202. The cloud computing system 202 may include one or more elements 203-213, as described in more detail below. As further shown in FIG. 2, the environment 200 may include a network 220 and/or a server device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the migration system 201 may include one or more elements 203-213 of the cloud computing system 202, may execute within the cloud computing system 202, and/or may be hosted within the cloud computing system 202, in some implementations, the migration system 201 may not be cloud-based (e.g., may be implemented outside of a cloud computing system) or may be partially cloud-based. For example, the migration system 201 may include one or more devices that are not part of the cloud computing system 202, such as device 300 of FIG. 3, which may include a standalone server or another type of computing device. The migration system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
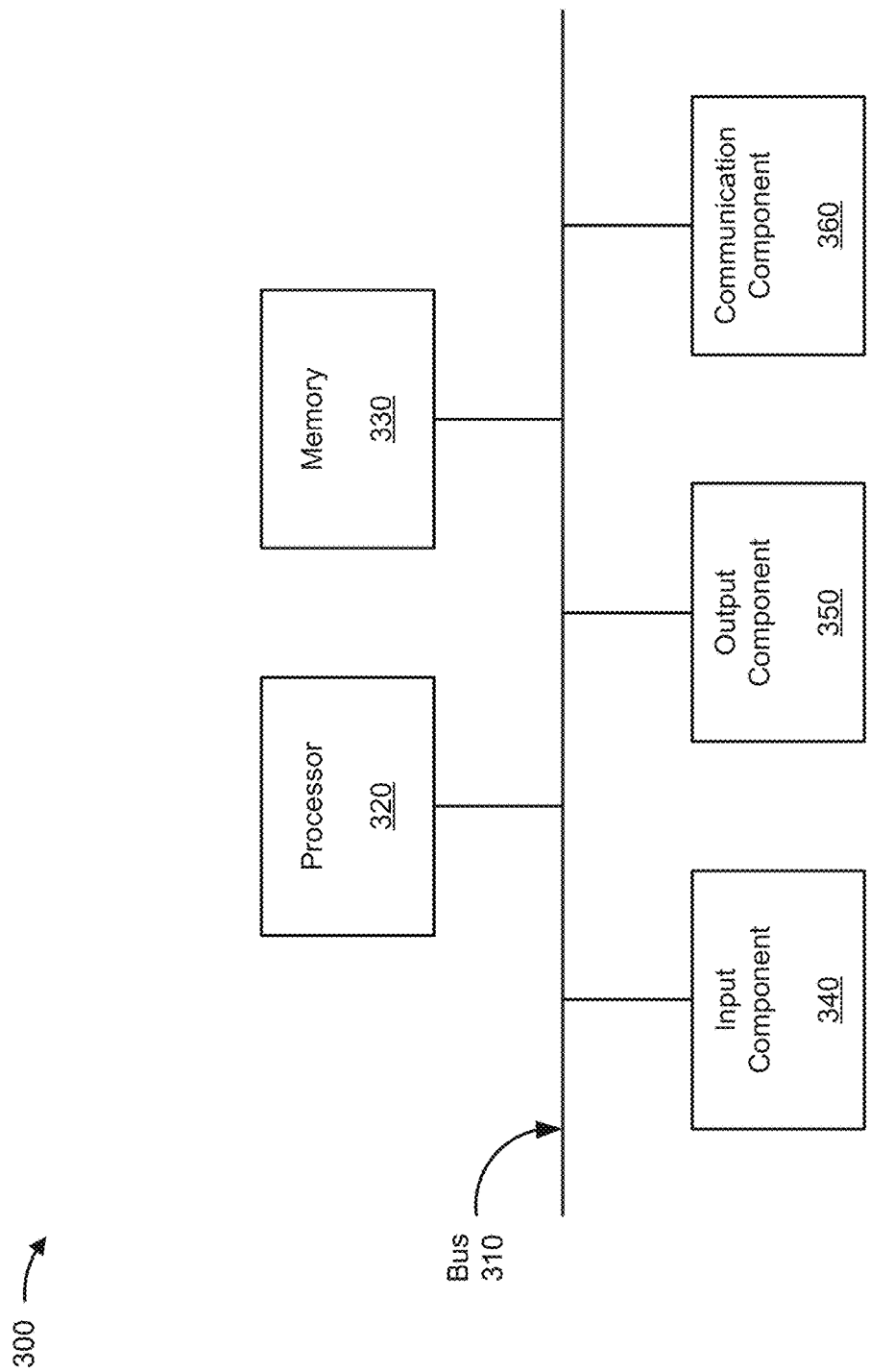
FIG. 3 is a diagram of example components of one or more devices of FIG. 2.

FIG. 3 is a diagram of example components of a device 300, which may correspond to the migration system 201 and/or the server device 230. In some implementations, the migration system 201 and/or the server device 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
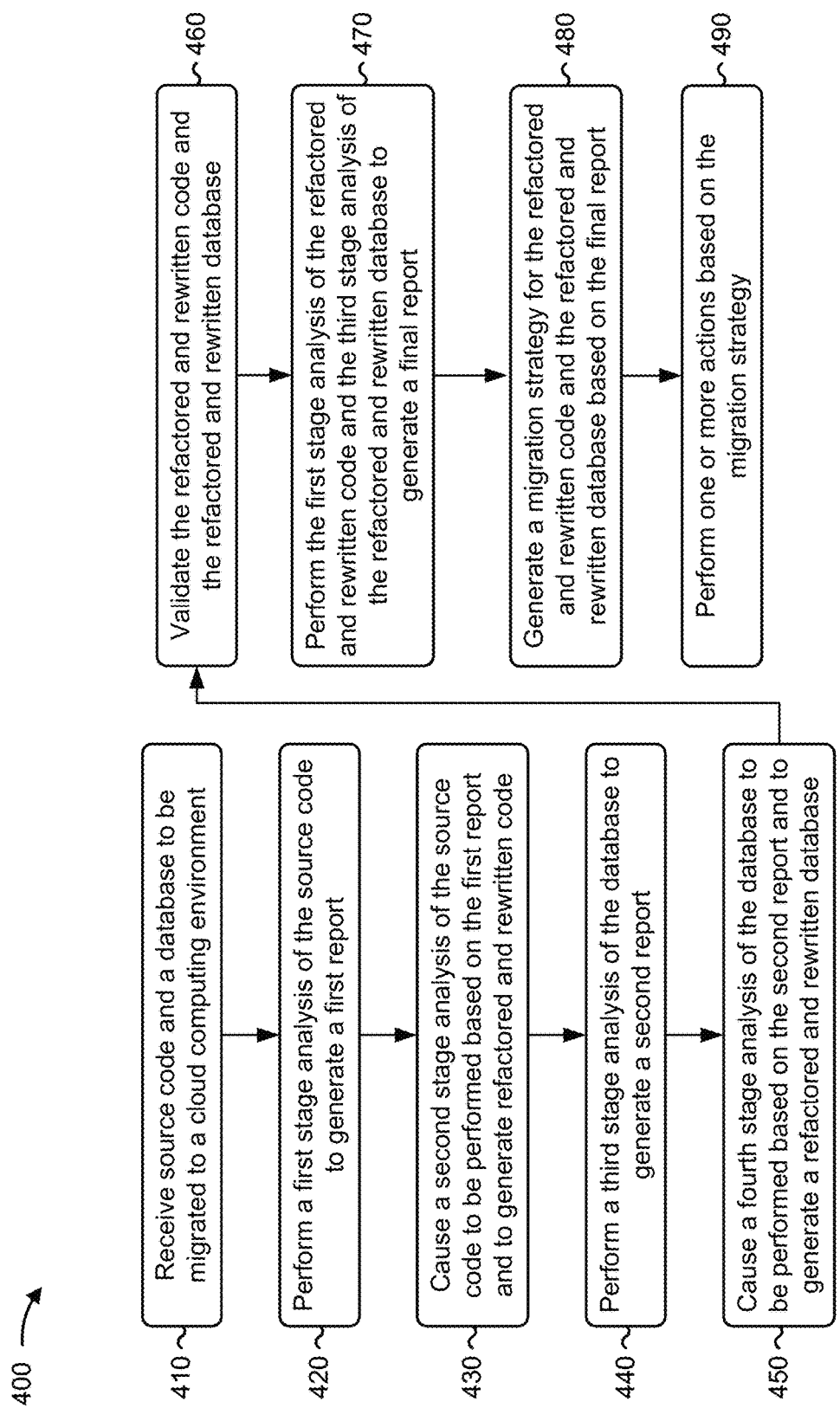
FIGS. 4 and 5 are flowcharts of example processes for utilizing multiple analyses to migrate an application to a cloud computing environment.

FIG. 4 is a flowchart of an example process 400 for utilizing multiple analyses to migrate an application to a cloud computing environment. In some implementations, one or more process blocks of FIG. 4 may be performed by a device (e.g., the migration system 201). In some implementations, one or more process blocks of FIG. 4 may be performed by another device or a group of devices separate from or including the device, such as a server device (e.g., the server device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving source code and a database to be migrated to a cloud computing environment (block 410). For example, the device may receive source code and a database to be migrated to a cloud computing environment, as described above.

As further shown in FIG. 4, process 400 may include performing a first stage analysis of the source code to generate a first report (block 420). For example, the device may perform a first stage analysis of the source code to generate a first report, as described above. In some implementations, performing the first stage analysis of the source code to generate the first report includes identifying components of the source code; calculating a technical quality of the components of the source code; filtering the components of the source code to identify one or more of classes, interfaces, or dependencies associated with the components of the source code; performing a refactoring analysis of the components of the source code to generate refactoring results; and generating the first report identifying the technical quality of the components of the source code, the one or more of the classes, the interfaces, or the dependencies associated with the components of the source code, and the refactoring results.

As further shown in FIG. 4, process 400 may include causing a second stage analysis of the source code to be performed based on the first report and to generate refactored and rewritten code (block 430). For example, the device may cause a second stage analysis of the source code to be performed based on the first report and to generate refactored and rewritten code, as described above. In some implementations, causing the second stage analysis of the source code to be performed based on the first report and to generate the refactored and rewritten code includes causing the source code to be refactored based on the first report and to generate refactored code, and causing the refactored code to be rewritten based on the first report and to generate the refactored and rewritten code.

As further shown in FIG. 4, process 400 may include performing a third stage analysis of the database to generate a second report (block 440). For example, the device may perform a third stage analysis of the database to generate a second report, as described above. In some implementations, performing the third stage analysis of the database to generate the second report includes identifying components of the database, performing a refactoring analysis of the components of the database to generate refactoring results, and generating the second report identifying the components of the database and the refactoring results.

As further shown in FIG. 4, process 400 may include causing a fourth stage analysis of the database to be performed based on the second report and to generate a refactored and rewritten database (block 450). For example, the device may cause a fourth stage analysis of the database to be performed based on the second report and to generate a refactored and rewritten database, as described above. In some implementations, causing the fourth stage analysis of the database to be performed based on the second report and to generate the refactored and rewritten database includes causing the database to be refactored based on the second report and to generate a refactored database, and causing the refactored database to be rewritten based on the second report and to generate the refactored and rewritten database.

As further shown in FIG. 4, process 400 may include validating the refactored and rewritten code and the refactored and rewritten database (block 460). For example, the device may validate the refactored and rewritten code and the refactored and rewritten database, as described above.

As further shown in FIG. 4, process 400 may include performing the first stage analysis of the refactored and rewritten code and the third stage analysis of the refactored and rewritten database to generate a final report (block 470). For example, the device may perform the first stage analysis of the refactored and rewritten code and the third stage analysis of the refactored and rewritten database to generate a final report, as described above. In some implementations, performing the first stage analysis of the refactored and rewritten code and the third stage analysis of the refactored and rewritten database to generate the final report includes identifying components of the refactored and rewritten code; calculating a technical quality of the components of the refactored and rewritten code; filtering the components of the refactored and rewritten code to identify one or more of classes, interfaces, or dependencies associated with the components of the refactored and rewritten code; performing a refactoring analysis of the components of the refactored and rewritten code to generate refactoring results; generating a first portion of the final report identifying the technical quality of the components of the refactored and rewritten code, the one or more of the classes, the interfaces, or the dependencies associated with the components of the refactored and rewritten code, and the refactoring results; identifying components of the refactored and rewritten database; performing a refactoring analysis of the components of the refactored and rewritten database to generate additional refactoring results; generating a second portion of the final report identifying the components of the refactored and rewritten database and the additional refactoring results; and generating the final report based on the first portion of the final report and the second portion of the final report.

As further shown in FIG. 4, process 400 may include generating a migration strategy for the refactored and rewritten code and the refactored and rewritten database based on the final report (block 480). For example, the device may generate a migration strategy for the refactored and rewritten code and the refactored and rewritten database based on the final report, as described above. In some implementations, generating the migration strategy for the refactored and rewritten code and the refactored and rewritten database based on the final report includes generating a proposed migration strategy for the refactored and rewritten code and the refactored and rewritten database based on the final report; receiving input associated with the proposed migration strategy; and generating the migration strategy for the refactored and rewritten code and the refactored and rewritten database based on the proposed migration strategy and the input. As further shown in FIG. 4, process 400 may include performing one or more actions based on the migration strategy (block 490). For example, the device may perform one or more actions based on the migration strategy, as described above. In some implementations, performing the one or more actions includes providing the migration strategy for display, or migrating the refactored and rewritten code and the refactored and rewritten database to the cloud computing environment based on the migration strategy. In some implementations, performing the one or more actions includes determining completion times associated with migrating the refactored and rewritten code and the refactored and rewritten database to the cloud computing environment, generating a summary of the completion times, and providing the summary for display.

In some implementations, performing the one or more actions includes determining successes associated with migrating the refactored and rewritten code and the refactored and rewritten database, generating a summary of the successes, and providing the summary for display. In some implementations, performing the one or more actions includes receiving a change to the migration strategy, modifying the migration strategy based on the change and to generate a modified migration strategy, and migrating the refactored and rewritten code and the refactored and rewritten database to the cloud computing environment based on the modified migration strategy. In some implementations, performing the one or more actions includes generating a summary of migrating the refactored and rewritten code and the refactored and rewritten database to the cloud computing environment based on the migration strategy, and providing the summary for display.

In some implementations, process 400 includes performing a validation of the source code and a validation of access to the database prior to performing analyses on the source code and the database.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
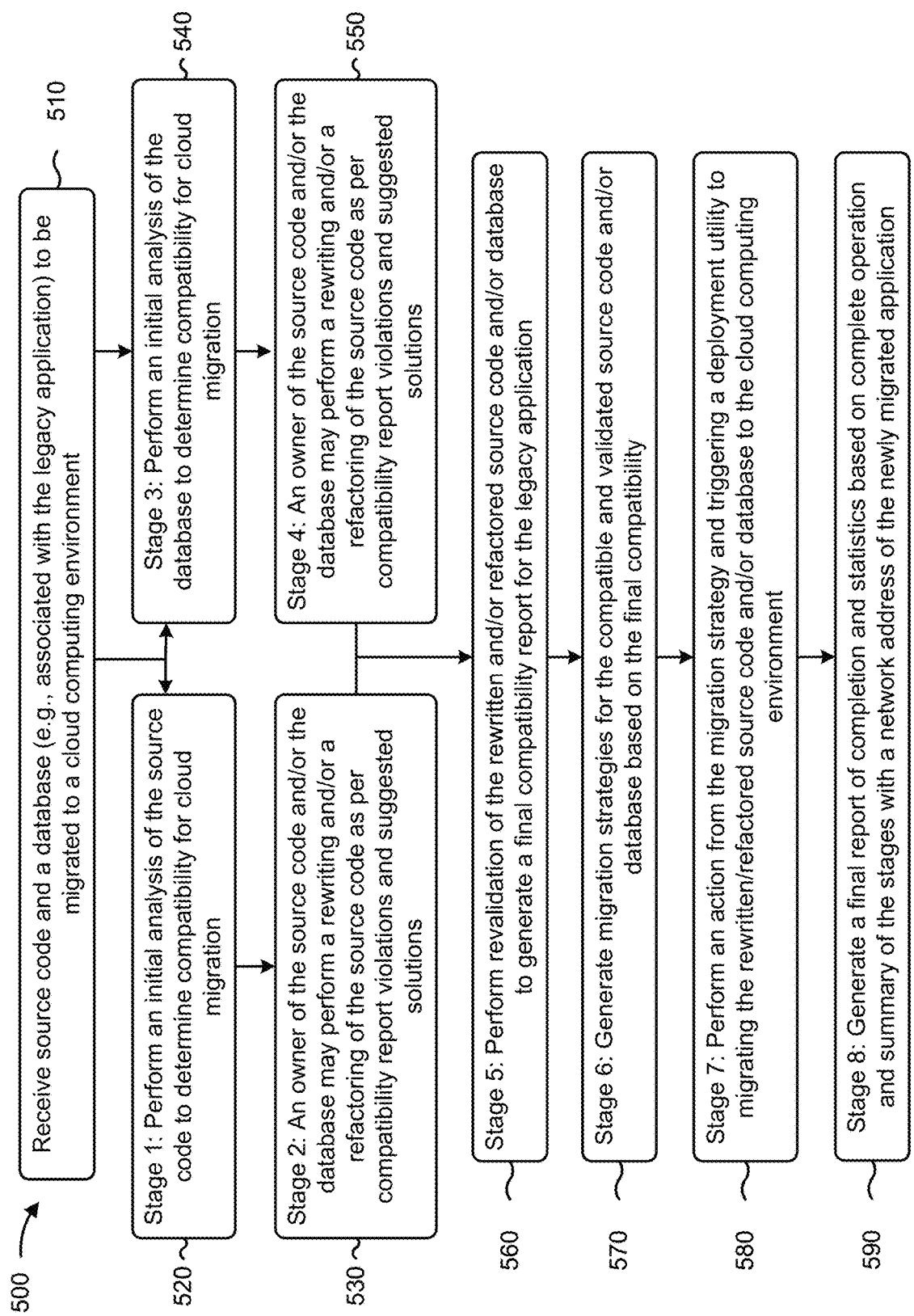

FIG. 5 is a flowchart of an example process 500 for utilizing multiple analyses to migrate a legacy application to a cloud computing environment. In some implementations, one or more process blocks of FIG. 5 may be performed by a device (e.g., the migration system 201). In some implementations, one or more process blocks of FIG. 5 may be performed by another device or a group of devices separate from or including the device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication component 360.

As shown in FIG. 5, process 500 may include receiving source code and a database to be migrated to a cloud computing environment (block 510). For example, the device may receive source code and a database (e.g., associated with the legacy application) to be migrated to a cloud computing environment, as described above.

As further shown in FIG. 5, process 500 may include performing an initial analysis of the source code to determine compatibility for cloud migration (block 520). For example, in a first stage (e.g., stage 1), the device may perform an initial analysis of the source code to determine compatibility for cloud migration.

As further shown in FIG. 5, process 500 may include performing a rewriting and/or a refactoring of the source code as per compatibility report violations and suggested solutions (block 530). For example, in a second stage (e.g., stage 2), an owner of the source code and/or the database may perform a rewriting and/or a refactoring of the source code as per compatibility report violations and suggested solutions.

As further shown in FIG. 5, process 500 may include performing an initial analysis of the database to determine compatibility for cloud migration (block 540). For example, in a third stage (e.g., stage 3), the device may perform an initial analysis of the database to determine compatibility for cloud migration.

As further shown in FIG. 5, process 500 may include performing a rewriting and/or a refactoring of the database as per compatibility report violations and suggested solutions (block 550). For example, in a fourth stage (e.g., stage 4), an owner of the source code and/or the database may perform a rewriting and/or a refactoring of the source code as per compatibility report violations and suggested solutions. In some implementations, the analysis for generation of the compatibility report may include execution of the four stages (e.g., stages 1 through 4), where stages 1 and 3 may be executed by the migration system in parallel and stages 2 and 4 may be performed by an owner of a legacy application since the legacy application may require code rewriting and refactoring which may be customized based on a client's ecosystem.

As further shown in FIG. 5, process 500 may include performing revalidation of the rewritten and/or refactored source code and/or database to generate a final compatibility report for the legacy application (block 560). For example, in a fifth stage (e.g., stage 5), the device may perform revalidation of the rewritten and/or refactored source code and/or database to generate a final compatibility report for the legacy application.

As further shown in FIG. 5, process 500 may include generating a migration strategy for the compatible and validated source code and/or database based on the final compatibility report (block 570). For example, in a sixth stage (e.g., stage 6), the device may generate migration strategies for the compatible and validated source code and/or database based on the final compatibility.

As further shown in FIG. 5, process 500 may include performing an action from the migration strategy and triggering a deployment utility to migrating the rewritten/refactored source code and/or database to the cloud computing environment (block 580). For example, in a seventh stage (e.g., stage 7), the device may perform an action from the migration strategy and triggering a deployment utility to migrating the rewritten/refactored source code and/or database to the cloud computing environment.

As further shown in FIG. 5, process 500 may include generating a final report of completion and statistics based on complete operation and summary of the stages with a network address of the newly migrated application (block 590). For example, in an eighth stage (e.g., stage 8), the device may generate a final report of completion and statistics based on complete operation and summary of the stages with a network address of the newly migrated application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for generating a migration strategy for source code and a database to be migrated to a cloud computing environment, comprising:

receiving, by a device, the source code and the database to be migrated to the cloud computing environment;

performing, by the device, a first stage analysis of the source code to generate a first report;

causing, by the device, a second stage analysis of the source code to be performed based on the first report and to generate refactored and rewritten code;

performing, by the device, a third stage analysis of the database to generate a second report;

causing, by the device, a fourth stage analysis of the database to be performed based on the second report and to generate a refactored and rewritten database;

validating, by the device, the refactored and rewritten code and the refactored and rewritten database;

performing, by the device, the first stage analysis of the refactored and rewritten code and the third stage analysis of the refactored and rewritten database to generate a final report;

generating, by the device, a migration strategy for the refactored and rewritten code and the refactored and rewritten database based on the final report; and performing, by the device, one or more actions based on the migration strategy.

2. The method of claim 1, further comprising:
performing a validation of the source code and a validation of access to the database prior to performing analyses on the source code and the database.

3. The method of claim 1, wherein performing the first stage analysis of the source code to generate the first report comprises:
identifying components of the source code;
calculating a technical quality of the components of the source code;
filtering the components of the source code to identify one or more of classes, interfaces, or dependencies associated with the components of the source code;
performing a refactoring analysis of the components of the source code to generate refactoring results; and
generating the first report identifying the technical quality of the components of the source code, the one or more of the classes, the interfaces, or the dependencies associated with the components of the source code, and the refactoring results.

4. The method of claim 1, wherein causing the second stage analysis of the source code to be performed based on the first report and to generate the refactored and rewritten code comprises:
causing the source code to be refactored based on the first report and to generate refactored code; and
causing the refactored code to be rewritten based on the first report and to generate the refactored and rewritten code.

5. The method of claim 1, wherein performing the third stage analysis of the database to generate the second report comprises:
identifying components of the database;
performing a refactoring analysis of the components of the database to generate refactoring results; and
generating the second report identifying the components of the database and the refactoring results.

6. The method of claim 1, wherein causing the fourth stage analysis of the database to be performed based on the second report and to generate the refactored and rewritten database comprises:
causing the database to be refactored based on the second report and to generate a refactored database; and causing the refactored database to be rewritten based on the second report and to generate the refactored and rewritten database.

7. The method of claim 1, wherein performing the first stage analysis of the refactored and rewritten code and the third stage analysis of the refactored and rewritten database to generate the final report comprises:
identifying components of the refactored and rewritten code;
calculating a technical quality of the components of the refactored and rewritten code;
filtering the components of the refactored and rewritten code to identify one or more of classes, interfaces, or dependencies associated with the components of the refactored and rewritten code;
performing a refactoring analysis of the components of the refactored and rewritten code to generate refactoring results;
generating a first portion of the final report identifying the technical quality of the components of the refactored and rewritten code, the one or more of the classes, the interfaces, or the dependencies associated with the components of the refactored and rewritten code, and the refactoring results;
identifying components of the refactored and rewritten database;
performing a refactoring analysis of the components of the refactored and rewritten database to generate additional refactoring results;
generating a second portion of the final report identifying the components of the refactored and rewritten database and the additional refactoring results; and
generating the final report based on the first portion of the final report and the second portion of the final report.

8. A device, comprising:
one or more memories; and
one or more processors, coupled to the one or more memories, configured to:
receive source code and a database to be migrated to a cloud computing environment;
perform a validation of the source code and a validation of access to the database;
perform a first stage analysis of the source code to generate a first report;
cause a second stage analysis of the source code to be performed based on the first report and to generate refactored and rewritten code;
perform a third stage analysis of the database to generate a second report;
cause a fourth stage analysis of the database to be performed based on the second report and to generate a refactored and rewritten database;
validate the refactored and rewritten code and the refactored and rewritten database;
perform the first stage analysis of the refactored and rewritten code and the third stage analysis of the refactored and rewritten database to generate a final report;
generate a migration strategy for the refactored and rewritten code and the refactored and rewritten database based on the final report; and
perform one or more actions based on the migration strategy.

9. The device of claim 8, wherein the one or more processors, to generate the migration strategy for the refactored and rewritten code and the refactored and rewritten database based on the final report, are configured to:

generate a proposed migration strategy for the refactored and rewritten code and the refactored and rewritten database based on the final report;
receive input associated with the proposed migration strategy; and
generate the migration strategy for the refactored and rewritten code and the refactored and rewritten database based on the proposed migration strategy and the input.

10. The device of claim 8, wherein the one or more processors, to perform the one or more actions, are configured to one or more:
provide the migration strategy for display; or
migrate the refactored and rewritten code and the refactored and rewritten database to the cloud computing environment based on the migration strategy.

11. The device of claim 8, wherein the one or more processors, to perform the one or more actions, are configured to:
determine completion times associated with migrating the refactored and rewritten code and the refactored and rewritten database to the cloud computing environment;
generate a summary of the completion times; and
provide the summary for display.

12. The device of claim 8, wherein the one or more processors, to perform the one or more actions, are configured to:
determine successes associated with migrating the refactored and rewritten code and the refactored and rewritten database;
generate a summary of the successes; and
provide the summary for display.

13. The device of claim 8, wherein the one or more processors, to perform the one or more actions, are configured to:
receive a change to the migration strategy;
modify the migration strategy based on the change and to generate a modified migration strategy; and
migrate the refactored and rewritten code and the refactored and rewritten database to the cloud computing environment based on the modified migration strategy.

14. The device of claim 8, wherein the one or more processors, to perform the one or more actions, are configured to:
generate a summary of migrating the refactored and rewritten code and the refactored and rewritten database to the cloud computing environment based on the migration strategy; and
provide the summary for display.

15. A non-transitory computer-readable medium storing a set of instructions, the set of instructions comprising:
one or more instructions that, when executed by one or more processors of a device, cause the device to:
receive source code and a database to be migrated to a cloud computing environment;
perform a first stage analysis of the source code to generate a first report;
cause a second stage analysis of the source code to be performed based on the first report and to generate refactored and rewritten code;
perform a third stage analysis of the database to generate a second report;
cause a fourth stage analysis of the database to be performed based on the second report and to generate a refactored and rewritten database;
validate the refactored and rewritten code and the refactored and rewritten database;
perform the first stage analysis of the refactored and rewritten code and the third stage analysis of the refactored and rewritten database to generate a final report;
generate a migration strategy for the refactored and rewritten code and the refactored and rewritten database based on the final report; and
migrate the refactored and rewritten code and the refactored and rewritten database to the cloud computing environment based on the migration strategy.

16. The non-transitory computer-readable medium of claim 15, wherein the one or more instructions, that cause the device to perform the first stage analysis of the source code to generate the first report, cause the device to:
identify components of the source code;
calculate a technical quality of the components of the source code;
filter the components of the source code to identify one or more of classes, interfaces, or dependencies associated with the components of the source code;
perform a refactoring analysis of the components of the source code to generate refactoring results; and
generate the first report identifying the technical quality of the components of the source code, the one or more of the classes, the interfaces, or the dependencies associated with the components of the source code, and the refactoring results.

17. The non-transitory computer-readable medium of claim 15, wherein the one or more instructions, that cause the device to cause the second stage analysis of the source code to be performed based on the first report and to generate the refactored and rewritten code, cause the device to:
cause the source code to be refactored based on the first report and to generate refactored code; and
cause the refactored code to be rewritten based on the first report and to generate the refactored and rewritten code.

18. The non-transitory computer-readable medium of claim 15, wherein the one or more instructions, that cause the device to perform the third stage analysis of the database to generate the second report, cause the device to:
identify components of the database;
perform a refactoring analysis of the components of the database to generate refactoring results; and
generate the second report identifying the components of the database and the refactoring results.

19. The non-transitory computer-readable medium of claim 15, wherein the one or more instructions, that cause the device to cause the fourth stage analysis of the database to be performed based on the second report and to generate the refactored and rewritten database, cause the device to:
cause the database to be refactored based on the second report and to generate a refactored database; and
cause the refactored database to be rewritten based on the second report and to generate the refactored and rewritten database.

20. The non-transitory computer-readable medium of claim 15, wherein the one or more instructions, that cause the device to perform the first stage analysis of the refactored and rewritten code and the third stage analysis of the refactored and rewritten database to generate the final report, cause the device to:
identify components of the refactored and rewritten code;

calculate a technical quality of the components of the refactored and rewritten code;
filter the components of the refactored and rewritten code to identify one or more of classes, interfaces, or dependencies associated with the components of the refactored and rewritten code;
perform a refactoring analysis of the components of the refactored and rewritten code to generate refactoring results;
generate a first portion of the final report identifying the technical quality of the components of the refactored and rewritten code, the one or more of the classes, the interfaces, or the dependencies associated with the components of the refactored and rewritten code, and the refactoring results;
identify components of the refactored and rewritten database;
perform a refactoring analysis of the components of the refactored and rewritten database to generate additional refactoring results;
generate a second portion of the final report identifying the components of the refactored and rewritten database and the additional refactoring results; and
generate the final report based on the first portion of the final report and the second portion of the final report.

* * * * *